I. R. REBER.
DEVICE FOR UNROLLING WOVEN WIRE.
APPLICATION FILED SEPT. 29, 1916.

1,250,011.

Patented Dec. 11, 1917.

WITNESSES

INVENTOR
IRVIN R. REBER
BY
ATTORNEYS

UNITED STATES PATENT OFFICE.

IRVIN R. REBER, OF MARSHALL, MINNESOTA.

DEVICE FOR UNROLLING WOVEN WIRE.

1,250,011.   Specification of Letters Patent.   Patented Dec. 11, 1917.

Application filed September 29, 1916. Serial No. 122,824.

*To all whom it may concern:*

Be it known that I, IRVIN R. REBER, a citizen of the United States, resident of Marshall, county of Lyon, State of Minnesota, have invented certain new and useful Improvements in Devices for Unrolling Woven Wire, of which the following is a specification.

The object of my invention is to provide means by which a reel of woven wire can be easily and quickly unrolled upon the ground preparatory to building a fence.

Other objects of the invention will appear from the following detailed description.

The invention consists generally in various constructions and combinations, all as hereinafter described and particularly pointed out in the claim.

Figure 1:
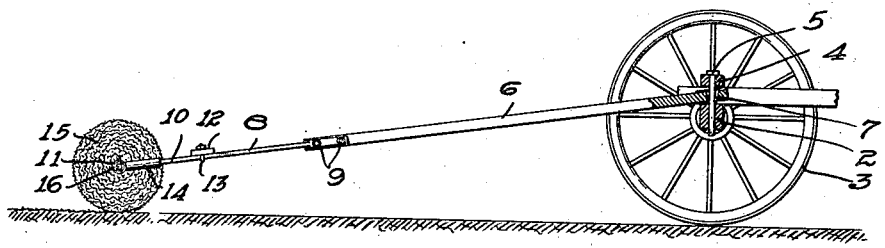
Figure 2:
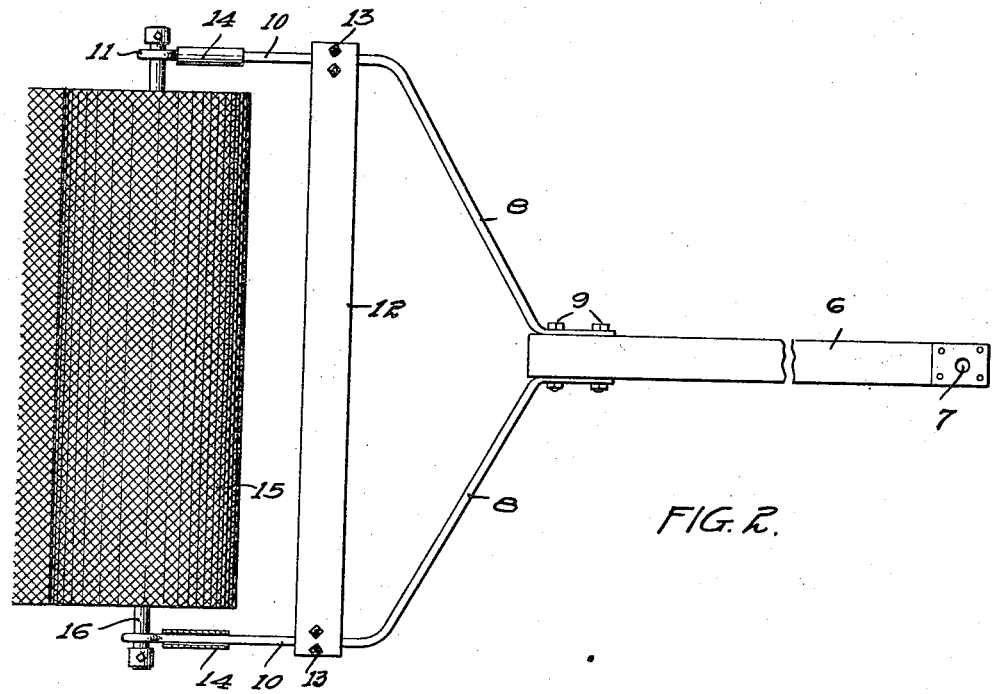
Figure 3:
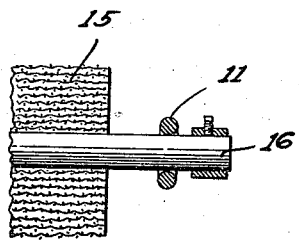

In the accompanying drawings forming part of this specification,

Figure 1 is a side view of my woven wire unrolling device attached to the forward axle of the wagon, Fig. 2 is a plan view of the device removed from the axle, Fig. 3 is a detail view of one of the reel supporting arms, showing the preferred manner of mounting the reel thereon.

In the drawing, 2 represents the forward axle of a wagon, having carrying wheels 3 and a holder 4 for the king-bolt 5. 6 is a bar of suitable material, preferably a wooden two by four, having a hole 7 to receive the king-bolt, the bar projecting rearwardly from the axle. 8 represent arms secured at their forward ends by bolts 9 to the rear end of the bar, diverging therefrom and having their rear ends 10 in parallel relation and provided with eyes 11. 12 is a cross bar secured by U-bolts 13 to the arms 8 and operating to hold the arms in their proper relative position. Between the bar 12 and the eyes 11 I provide anti-friction rollers 14 which are free to revolve on the rear portions of the arms and form an anti-friction contact for the wire as it is unrolled from the reel. 15 is a reel or spool of woven wire and 16 is a support, preferably of gas pipe, which passes through the eyes 11 and through the spool and is revolved to unwind the woven wire and drop it upon the ground in the rear of the axle.

The device can be made of suitable width for any dimension of woven wire desired.

In using the device, the king-bolt of the wagon is put through the hole in the bar 6 and the driver, standing on the axle, drives the team from one corner of the fence to the other, while the wire unrolls behind the wheels upon the ground. As soon as one roll of wire is exhausted another can be easily and quickly substituted therefor.

In various ways the details of construction herein shown and described may be modified and still be within the scope of my invention.

I claim as my invention:

A device for unrolling woven wire comprising a bar having a socket at its forward end to receive the king bolt of an axle, arms secured to the rear portion of said bar and diverging therefrom and having substantially parallel rear ends with means for holding them in parallel relation, said arms being provided with eyes, a spindle loosely mounted in said eyes and forming a support for a roll of wire, and anti-friction rollers mounted on said arms in front of and adjacent to said support.

In witness whereof, I have hereunto set my hand this 21st day of September, 1916.

IRVIN R. REBER.

Witnesses:
J. VON WILLIAMS,
H. S. SIMONS.

Copies of this patent may be obtained for five cents each, by addressing the "Commissioner of Patents, Washington, D. C."